US012679573B2

(12) United States Patent
Arbiv et al.

(10) Patent No.: US 12,679,573 B2
(45) Date of Patent: Jul. 14, 2026

(54) VTOL PROPELLER ADAPTER AND METHOD

(71) Applicant: AeroVironment, Inc., Arlington, VA (US)

(72) Inventors: Mark S. Arbiv, Granada Hills, CA (US); Lindsay Aspinwall Sheppard, Simi Valley, CA (US)

(73) Assignee: Aero Vironment, Inc., Arlington, VA (US)

( * ) Notice: Subject to any disclaimer, the term of this patent is extended or adjusted under 35 U.S.C. 154(b) by 103 days.

(21) Appl. No.: 18/412,922

(22) Filed: Jan. 15, 2024

(65) Prior Publication Data

US 2025/0353621 A1 Nov. 20, 2025

Related U.S. Application Data

(60) Provisional application No. 63/439,063, filed on Jan. 13, 2023.

(51) Int. Cl.
B64U 30/292 (2023.01)
B64U 10/20 (2023.01)

(52) U.S. Cl.
CPC ........... B64U 30/292 (2023.01); B64U 10/20 (2023.01)

(58) Field of Classification Search
CPC ...... B64U 30/292; B64U 10/20; B64C 27/32; B64C 27/40; B64C 27/14; B64D 27/40; B64D 27/32
See application file for complete search history.

(56) References Cited

U.S. PATENT DOCUMENTS

| | | | | | |
|---|---|---|---|---|---|
| 2,021,481 A | * | 11/1935 | Dornier | ................... | B64C 11/00 |
| | | | | | 416/142 |
| 2,369,276 A | * | 2/1945 | Cameron | ................ | B64C 11/28 |
| | | | | | 416/131 |
| 2,421,514 A | * | 6/1947 | Martin | .................. | B64C 11/306 |
| | | | | | 416/34 |
| 2,490,486 A | * | 12/1949 | George | .................... | B60B 3/18 |
| | | | | | 301/9.1 |
| 2,715,445 A | * | 8/1955 | Williamson | ............ | F02B 75/34 |
| | | | | | 446/57 |
| 2,931,471 A | * | 4/1960 | Howard, Jr. | .............. | F16B 5/10 |
| | | | | | 40/200 |

(Continued)

FOREIGN PATENT DOCUMENTS

WO 2020232585 A1 11/2020

OTHER PUBLICATIONS

SRP Aero; Lynx VTOL; Publication Date May 19, 2020; Swift Radioplanes, LLC; pp. 154, 155.*

(Continued)

*Primary Examiner* — Medhat Badawi
(74) *Attorney, Agent, or Firm* — Christopher R. Balzan, Esq.; Eric J. Aagaard, Esq.

(57) ABSTRACT

In one possible embodiment, a propeller adapter is provided which includes a base having at least one fastener hole therethrough and a propeller alignment boss extending upward from the base. Opposing capture walls extend upward from the base, each of the opposing capture walls have a lip extending inward to capture and retain corresponding opposing outside edges of a root portion of a propeller therein upon seating of the propeller root portion between the opposing blade capture walls.

15 Claims, 5 Drawing Sheets

(56) References Cited

U.S. PATENT DOCUMENTS

| | | | | | |
|---|---|---|---|---|---|
| 3,061,341 | A | * | 10/1962 | Grzych | B64C 11/04 |
| | | | | | 244/65 |
| 3,592,412 | A | * | 7/1971 | Glatfelter | B64C 29/0033 |
| | | | | | 416/142 |
| 4,204,806 | A | * | 5/1980 | Blanchard | B63H 1/24 |
| | | | | | 416/142 |
| 4,252,504 | A | * | 2/1981 | Covington | B64C 27/50 |
| | | | | | 416/221 |
| 4,477,225 | A | * | 10/1984 | Burkam | B64C 27/35 |
| | | | | | 416/134 A |
| 4,611,972 | A | * | 9/1986 | Andrae | B64C 11/04 |
| | | | | | 403/312 |
| 4,756,638 | A | * | 7/1988 | Neyret | E05B 9/084 |
| | | | | | 70/451 |
| 5,183,384 | A | * | 2/1993 | Trumbly | B63H 1/24 |
| | | | | | 416/142 |
| 6,010,306 | A | * | 1/2000 | Bucher | F04D 29/34 |
| | | | | | 416/5 |
| 6,085,557 | A | * | 7/2000 | Kaye, Jr. | E05B 73/0076 |
| | | | | | 416/245 A |
| 6,226,068 | B1 | * | 5/2001 | Arcykiewicz | H01R 13/625 |
| | | | | | 439/314 |
| 6,226,870 | B1 | * | 5/2001 | Barish | B26B 19/14 |
| | | | | | 30/34.2 |
| 6,371,726 | B1 | * | 4/2002 | Jonsson | B63H 1/24 |
| | | | | | 416/142 |
| 7,081,081 | B2 | * | 7/2006 | Schutz | B04B 9/08 |
| | | | | | 494/12 |
| 7,086,843 | B2 | * | 8/2006 | Cheng | F04D 29/263 |
| | | | | | 417/423.1 |
| 7,118,066 | B2 | * | 10/2006 | Allen | B64C 5/06 |
| | | | | | 244/7 B |
| 7,159,817 | B2 | * | 1/2007 | Vander | B64C 39/08 |
| | | | | | 244/17.23 |
| 7,946,526 | B2 | * | 5/2011 | Zimet | B64U 30/24 |
| | | | | | 244/17.23 |
| 8,997,618 | B1 | * | 4/2015 | Majcen | B24B 45/006 |
| | | | | | 83/698.41 |
| 9,057,273 | B2 | * | 6/2015 | Wang | B64C 27/32 |
| 9,113,595 | B2 | * | 8/2015 | Roth | A01D 34/664 |
| 9,260,184 | B2 | * | 2/2016 | Olm | B64U 10/14 |
| 9,284,040 | B2 | * | 3/2016 | Wang | F01D 5/021 |
| 9,630,703 | B2 | * | 4/2017 | Wang | B64C 27/32 |
| 9,694,911 | B2 | * | 7/2017 | Bevirt | B64D 27/357 |
| 10,160,538 | B2 | * | 12/2018 | Wang | B64C 27/14 |
| 10,196,138 | B2 | * | 2/2019 | Wang | B64C 27/32 |
| 10,259,554 | B1 | * | 4/2019 | Eichinger | B63H 20/14 |
| 10,507,903 | B2 | * | 12/2019 | Ghapgharan | B64U 50/19 |
| 10,703,480 | B1 | * | 7/2020 | Thrun | B64F 1/35 |
| 10,745,119 | B2 | * | 8/2020 | Wang | A63H 27/02 |
| 10,780,974 | B2 | * | 9/2020 | Benson | B64C 27/30 |
| 10,780,975 | B2 | * | 9/2020 | Benson | B64C 27/30 |
| 11,267,565 | B2 | * | 3/2022 | Wang | F01D 5/025 |
| 11,643,219 | B1 | * | 5/2023 | Szmuk | B64C 29/02 |
| | | | | | 244/56 |
| 12,049,332 | B2 | * | 7/2024 | Wiberg | B64U 50/13 |
| 2004/0118970 | A1 | * | 6/2004 | Muylaert | B64C 27/50 |
| | | | | | 244/17.11 |
| 2010/0243820 | A1 | * | 9/2010 | Lim | B64C 27/30 |
| | | | | | 244/7 A |

| | | | | | |
|---|---|---|---|---|---|
| 2013/0129545 | A1 | * | 5/2013 | Kadono | F04D 29/263 |
| | | | | | 417/423.15 |
| 2013/0287577 | A1 | * | 10/2013 | Lin | B64U 30/291 |
| | | | | | 416/210 R |
| 2014/0116652 | A1 | * | 5/2014 | Ehinger | F28D 15/0208 |
| | | | | | 165/104.21 |
| 2014/0117149 | A1 | * | 5/2014 | Zhou | B64U 50/19 |
| | | | | | 244/17.23 |
| 2014/0356174 | A1 | * | 12/2014 | Wang | A63H 27/001 |
| | | | | | 416/204 R |
| 2015/0129711 | A1 | * | 5/2015 | Caubel | B64U 50/19 |
| | | | | | 244/17.23 |
| 2015/0275921 | A1 | * | 10/2015 | Pinkney | F16D 1/076 |
| | | | | | 416/204 R |
| 2016/0001879 | A1 | * | 1/2016 | Johannesson | B64U 30/293 |
| | | | | | 416/142 |
| 2016/0016654 | A1 | * | 1/2016 | Wang | B64C 27/32 |
| | | | | | 416/223 R |
| 2016/0200418 | A1 | * | 7/2016 | Wang | A63H 27/02 |
| | | | | | 416/204 R |
| 2016/0347446 | A1 | * | 12/2016 | Vetter | B64U 30/24 |
| 2017/0106978 | A1 | * | 4/2017 | Sopper | B65D 31/16 |
| 2017/0217578 | A1 | * | 8/2017 | Wang | B64C 27/32 |
| 2017/0240267 | A1 | * | 8/2017 | Tao | B64U 30/20 |
| 2017/0297738 | A1 | * | 10/2017 | von Flotow | B64D 1/02 |
| 2018/0043987 | A1 | * | 2/2018 | Ghapgharan | F01D 5/3023 |
| 2018/0186445 | A1 | * | 7/2018 | Fenny | B64C 39/06 |
| 2018/0229839 | A1 | * | 8/2018 | Kimchi | B64U 30/10 |
| 2018/0327087 | A1 | * | 11/2018 | Wang | B64C 11/02 |
| 2019/0092461 | A1 | * | 3/2019 | Duffy | B64U 70/80 |
| 2019/0100293 | A1 | * | 4/2019 | Ulgen | B63H 23/34 |
| 2019/0176978 | A1 | * | 6/2019 | Wang | F01D 5/021 |
| 2019/0193834 | A1 | * | 6/2019 | Deng | B64C 27/32 |
| 2019/0225332 | A1 | * | 7/2019 | Burns | B64U 50/13 |
| 2019/0256204 | A1 | * | 8/2019 | Sun | B64U 30/29 |
| 2019/0329866 | A1 | * | 10/2019 | Benson | B64U 50/13 |
| 2020/0081432 | A1 | * | 3/2020 | Szmuk | B64C 39/08 |
| 2020/0086984 | A1 | * | 3/2020 | LeGrand | B64C 27/26 |
| 2020/0089227 | A1 | * | 3/2020 | LeGrand | B64C 27/57 |
| 2020/0122828 | A1 | | 4/2020 | Kim et al. | |
| 2020/0148345 | A1 | * | 5/2020 | Wittmaak, Jr. | B64U 10/20 |
| 2020/0164976 | A1 | * | 5/2020 | Lovering | B64C 39/08 |
| 2020/0180756 | A1 | * | 6/2020 | Kapeter | B64U 50/13 |
| 2020/0223538 | A1 | * | 7/2020 | Easley | B64C 11/48 |
| 2020/0239150 | A1 | * | 7/2020 | Kimchi | B64U 50/23 |
| 2020/0377203 | A1 | * | 12/2020 | Wang | B64U 30/20 |
| 2021/0403161 | A1 | * | 12/2021 | Burns | B64C 39/08 |
| 2022/0363378 | A1 | * | 11/2022 | Schlak | B64C 30/00 |
| 2024/0010358 | A1 | * | 1/2024 | Grass | B64F 5/10 |
| 2025/0223037 | A1 | * | 7/2025 | Reese | B64D 1/00 |

OTHER PUBLICATIONS

CW & CCW Motors—Thread Direction and Prop Nut, Oscar Liang, Publication Date Jul. 2, 2015, All Pages.*
International Searching Authority/US, Patent Cooperation Treaty (PCT) International Search Report (ISR), for corresponding PCT Application No. PCT/US2024/011546 entitled VTOL Propeller Adapter and Method, mailed Apr. 3, 2024, 3pgs.
International Searching Authority/US; Patent Cooperation Treaty (PCT) Written Opinion (WO) for corresponding PCT Application No. PCT/US2024/011546 entitled VTOL Propeller Adapter and Method, mailed Apr. 3, 2024, 3pgs.

* cited by examiner

VTOL PROPELLER ADAPTER AND METHOD

CROSS REFERENCE TO RELATED APPLICATIONS

This application claims the benefit of U.S. Provisional Application No. 63/439,063 filed on 13 Jan. 2023, by Arbiv, et al., entitled VTOL PROPELLER ADAPTER AND METHOD, herein incorporated by reference in its entirety.

BACKGROUND

Vertical Takeoff and Landing or VTOL aircraft typically have removeable propellers so that they may be replaced if damaged, or removed for storage, and then reattached for flight. Conventional quadrotor VTOL unmanned aerial vehicles or UAVs, for example, connect the propeller to the motor with a screw located in the propeller along the central axis of rotation of the propeller and motor.

A central screw into the motor also provides correct propeller alignment, along with a way to ensure proper clockwise/counter clockwise pairing of propeller with its corresponding motor. This can be achieved by pairing the thread handedness on the propeller screw with the handedness of the motor rotor screw hole, thereby pairing the handedness of the propeller with the handedness of the motor. This mechanism prevents improper installation, i.e. installing a clockwise propeller onto a counter clockwise motor, or vice versa.

Although there are advantages with this arrangement, there are several drawbacks. For example, if the screw is not secured properly, it could loosen and potential damage the propeller, or even result in detachment of a propeller, thereby causing the aircraft to crash midflight. Furthermore, since there are typically four or more propellers per VTOL unmanned aerial vehicle which are removed after each flight for inspection and/or storage, there is an increased opportunity for damage of a propeller when the propellers are installed for flight.

What is needed is a connection that ensures correct propeller alignment and pairing with a motor. Further, what is needed is a low cost rigid connector that is easy and quick to install with improved reliability.

SUMMARY

In one possible embodiment, a propeller adapter is provided which includes a base having at least one fastener hole therethrough and a propeller alignment boss extending upward from the base. Opposing capture walls extend upward from the base, each of the opposing capture walls have a lip extending inward to capture and retain corresponding opposing outside edges of a root portion of a propeller therein upon seating of the propeller root portion between the opposing blade capture walls.

In a further embodiment, the propeller adapter further includes a differentiator slot in at least one of the opposing capture blade walls and includes a propeller differentiator overlay for affixing to the propeller, the propeller differentiator overlay has a differentiator tab extending laterally from the differentiator overlay so as to align with and fit within the slot in the at least one of the opposing blade capture walls.

In further embodiments, the alignment boss has an axially aligned central hole therethrough and is centrally disposed so as to center the propeller adapter above a central axis of the motor when mounted with the motor. In some embodiments, the base and the propeller differentiator overlay are color coded to correspond to a rotational orientation of the motor and the propeller. In some embodiments, the base of the propeller adapter and the propeller differentiator overlay comprise characters corresponding to a rotational orientation of the motor. In some embodiments, the blade capture walls extend upward from opposing peripheral edges of the base.

In one possible embodiment, a VTOL capable UAV is provided which includes a motor, a propeller having an alignment hole through a root portion of the propeller, and a propeller adapter mounted to the motor, the adapter having a base with at least one fastener hole therethrough to allow fastening of the adapter to the motor, an alignment boss extends upward from the base and opposing blade capture walls extend upward from the base, each of the opposing blade capture walls comprising a lip to capture and retain corresponding outside edges of a propeller root portion upon seating of the propeller root portion between the opposing blade capture walls, at least one of the opposing blade capture walls having an alignment slot. An alignment overlay is secured to the propeller, the alignment overlay has a tab extending laterally from the overlay so as to fit within the slot in the at least one of the opposing blade capture walls.

Other embodiments are also provided.

BRIEF DESCRIPTION OF THE DRAWINGS

The features and advantages of the present invention will be better understood with regard to the following description, appended claims, and accompanying drawings where:

DESCRIPTION

In multi propeller aircraft, which typically have motors with rotational orientation, i.e. clockwise or CW and counter clockwise or CCW motor operation. Consequently, in multi propeller aircraft, the propeller blade orientations are different depending on whether the propeller is for CW or CCW rotation. Improper installation will prevent the aircraft from flying. Removal and reinstallation of propellers of incorrectly installed propellers into the correct orientation/positions is consuming and potentially time exposes the aircraft to damage either while functioning in the incorrect configuration, during the removal and reinstallation of the propeller (s), or during subsequent operation after a hasty reinstallation.

Figure 1:
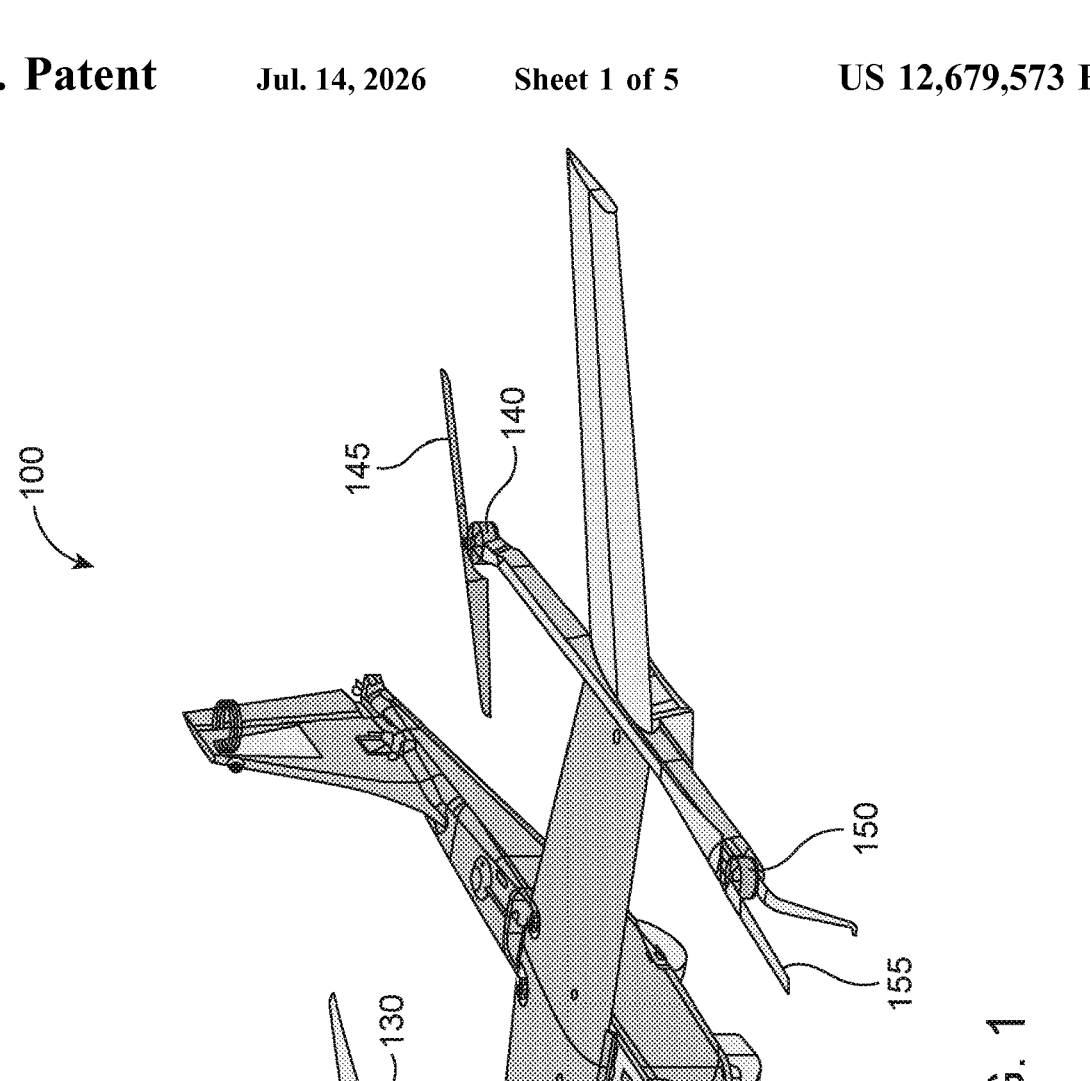
FIG. 1 shows a perspective view of an example of an unmanned aerial vehicle or UAV capable of vertical takeoff and landing or VTOL.

FIG. 1 shows a perspective view of an example of an unmanned aerial vehicle or UAV 100 capable of vertical takeoff and landing or VTOL. In addition to a forward-facing propeller 110, there are four vertical facing motors 120, 130, 140, and 150 with corresponding fixed pitch propellers 125, 135, 145 and 155. Two of the motors 120 and 140 have rotors that rotate in the clockwise or CW direction, and two motors 130 and 150 that rotate in the counterclock-wise or CCW direction. Propellers 125 and 145, designed to provide lift when rotated in the CW direction, are mounted to the CW motors 120 and 140, respectively, while propellers 135 and 155 designed to provide lift when rotated in the CCW direction are mounted to the CCW motors 130 and 150, respectively. An adapter 200 (shown in FIG. 2) is used to mount the propeller 125, 135, 145, or 155 to its respective motor 120, 130, 140, or 150.

Figure 2:
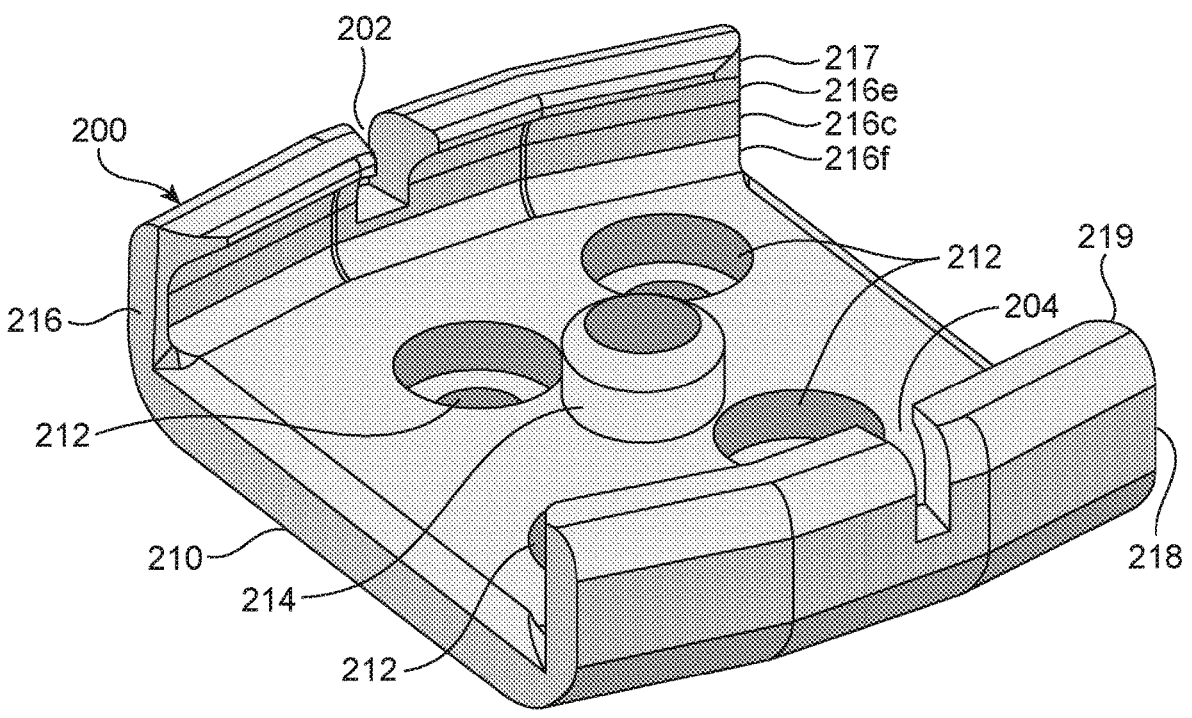
FIG. 2 is a perspective view illustrating a propeller adapter 200 in accordance with an embodiment of the invention.

FIG. 2 is a perspective view illustrating a propeller adapter 200 in accordance with an embodiment of the invention. The propeller adapter 200 has a base 210 with holes 212 through the base 210. All, or some of the screw holes 212 through the base may be used to align and secure the adapter 200 to the motor, such as by securing the base with screws (illustrated in FIG. 7). Some or all of the screw holes 212, for example opposing pairs of screw holes may be may be located at different distances from a central rotational axis of the adapter 210. In this embodiment, an alignment boss 214 extends up from the base in the central portion along the central rotational axis of the adapter 200. The alignment boss 214 is sized to mount within an alignment hole 625b (shown in FIG. 6.) located in a root portion 652r of a propeller 625 (shown in FIG. 6) along the central axis of rotation of the propeller.

In this embodiment, the adapter 200 has opposing capture walls 216 and 218, located at opposing peripheral edges of the base 210, which extend up from the base 210. A top portion of the capture walls 216 and 218 each have an inward lip 217 and 219, respectively, that extends inward over the base 210. The inward lips 217 and 219 and capture walls 216 and 218 facilitate capture and retention of a root portion of a propeller seated within the adapter.

Figure 3:
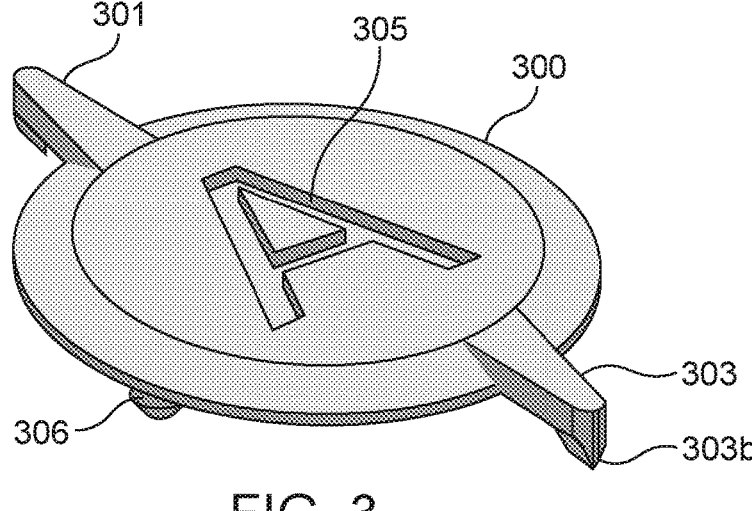
FIG. 3 is a perspective view of a propeller differentiator overlay 300, in accordance with at least one of the embodiments.

FIG. 3 is a perspective view of a propeller differentiator overlay 300, in accordance with at least one of the embodiments. The optional propeller differentiator overly 300 is mounted on a propeller to provide an indication of the handedness of the propeller, and to inhibit installation of the wrong propeller into an adapter that does not match its handedness, thereby preventing mounting of the wrong propeller on a motor. The differentiator overly 300 may include one or more differentiator tabs 301 and/or 303 that constructed to correspond with one or more alignment slots 202 and/or 204 provided in the adapter 200 (FIG. 2). A bottom portion 303b of the differentiator tabs 301 and/or 303 may be tapered to facilitate alignment and installation of the differentiator tabs 303 and 303 within the alignment slots 202 and 204.

In some embodiments the alignment slots 202 and 204 may have the same width. Or, in some embodiments, the alignment slots 202 and 204 may be different widths to ensure proper orientation of the propeller in the adapter. The widths of the differentiator tabs 301 and 303 could similarly have the same, or different widths to correspond with the slots.

The propeller differentiator overlay 300 may be affixed to a propeller, such as with adhesive, so that when a propeller having a propeller differentiator overlay 300 that corresponds with an adapter, the differentiator tabs 301 and 303 fit within the alignment slots 302 and 304 and allow mounting of the propeller within the adapter. The placement of the alignment slots 302 and 304 and the differentiator tabs 301 and 303 are positioned depending on whether they are used with CW motors and propellers, or with CCW motors and propellers. If the differentiator tabs 301 and 303 do not align with the alignment slots 302 and 304, the differentiator tabs 301 and 303 and attached propeller are blocked from being mounted within the adapter 200 (FIG. 2). This ensures that the propeller to which the overlay is affixed and the associated motor to which the adapter 300 is mounted both have the same handedness, CW or CCW.

As shown in FIGS. 2 and 3, the adapter 200 and differentiator overlay 300 may have a character 305, for example "A" as shown, or one or more other character(s), which may be marked, painted, scribed, and/or recessed (as shown in FIG. 3) on/into the differentiator overlay 300. Although not shown in FIG. 2, a corresponding character(s) similarly preferably would be marked, painted, scribed, and/or recessed on/into the adapter 200. Additionally, or alternatively, the adapter 200 and the differentiator overlay 300 may be patterned, or color coded, i.e. the same or similar color(s), or patterns, to indicate compatibility between the adapter 200 and the overlay 305, thereby ensuring rotational compatibility between the motor and the propeller. In another embodiment, while the adapter 200 and the overly 305 may be the same color, the character markings "A" have a same or similar color to indicate compatibility. This gives a quick and simple visual indication that the adapter 200 and the overlay 305 are compatible prior to selecting the propeller and attempting to mount it to the motor. Thus, it gives an indication when selecting the proper propeller, after selecting it, immediately prior to attempting to mount the propeller, and during the propeller mounting process, that the propeller and the motor to which the adapter is to be mounted both have the rotational compatibility, i.e., CW or CCW. Thus, for example, the character marking "A" may be used to indicate CW rotation, while the character "B" may indicate CCW rotation.

Figures 4A, 4B:
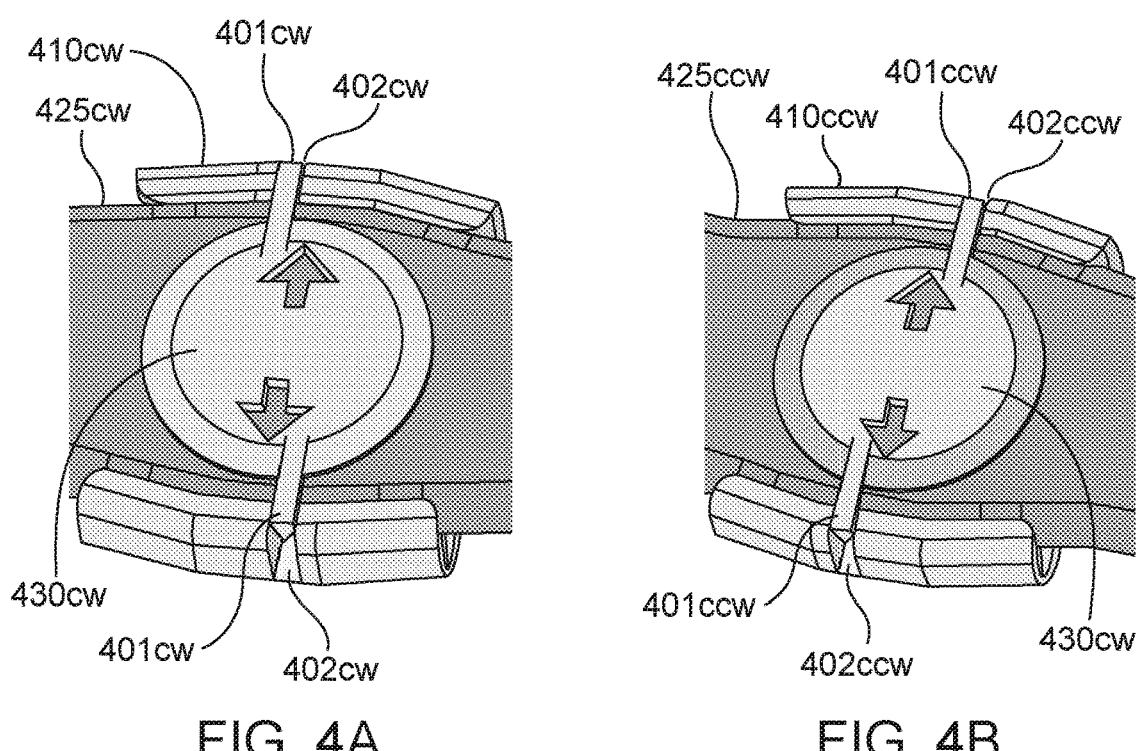
FIG. 4A shows a top perspective view of an embodiment of a CW propeller mounted in a CW adapter.
FIG. 4B shows a top perspective view of an embodiment of a CCW propeller mounted in a CCW adapter.

FIG. 4A shows a top perspective view of an embodiment of a CW propeller 425cw mounted in a CW adapter 410cw. In this embodiment, the differentiator tabs 401cw of the CW differentiator overly 430cw are aligned within the alignment slots 402cw of the CW adapter 410cw.

FIG. 4B shows a top perspective view of an embodiment of a CCW propeller 425ccw mounted in a CCW adapter 410ccw. In this embodiment, the differentiator tabs 401ccw of the CCW differentiator 430ccw overly are aligned within the alignment slots 402ccw of the CCW adapter 410ccw.

Figure 4C:
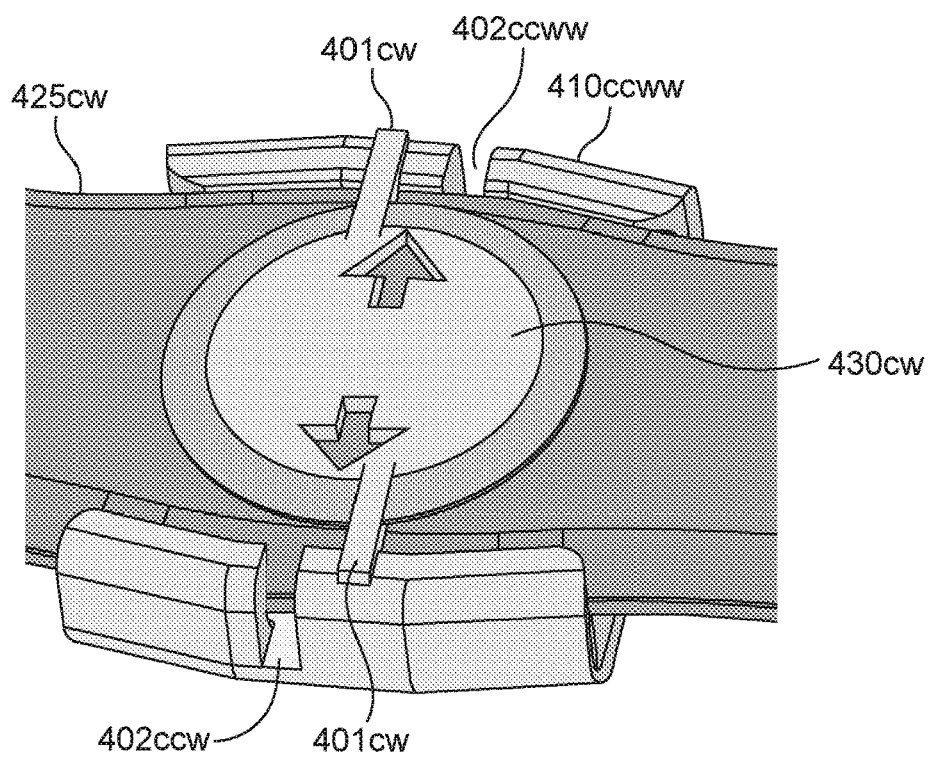
FIG. 4C shows a top perspective view of an embodiment of a CW propeller improperly partially mounted in a CCW adapter.

FIG. 4C shows a top perspective view of an embodiment of a CW propeller 425cw improperly partially mounted in a CCW adapter 410ccw. In this embodiment, the differentiator tabs 401cw of the CW differentiator overly 430cw do not align within the alignment slots 402ccw of the CWW adapter 410ccw. This inhibits incorrect installation of the CW propeller 425cw a with CCW motor because the differentiator tabs 401cw on the CW differentiator 430cw, which is affixed to this CW propeller 425cw, are inhibited from being installed in the CCW alignment slots 402ccw in the non-corresponding CCW adapter 410ccw mounted to a CCW motor. Thus, since the differentiator tabs 410cw do not align with the alignment slots 402ccw, the propeller 425cw is prevented installed therein, indicating to the from being correctly installer that the propeller 425*cw* and motor are not rotationally matched. In some embodiment, attempted installation of a CW propeller 425*cw* in a CCW adapter 410*ccw* could damage, or even break off the CW differentiator tabs 401*cw*, or cause the CW differentiator 430*cw* to separate from the CW propeller 425*cw*, thereby indicating to the installer that the wrong propeller is being installed on a non-rotational matched motor.

Figure 5:
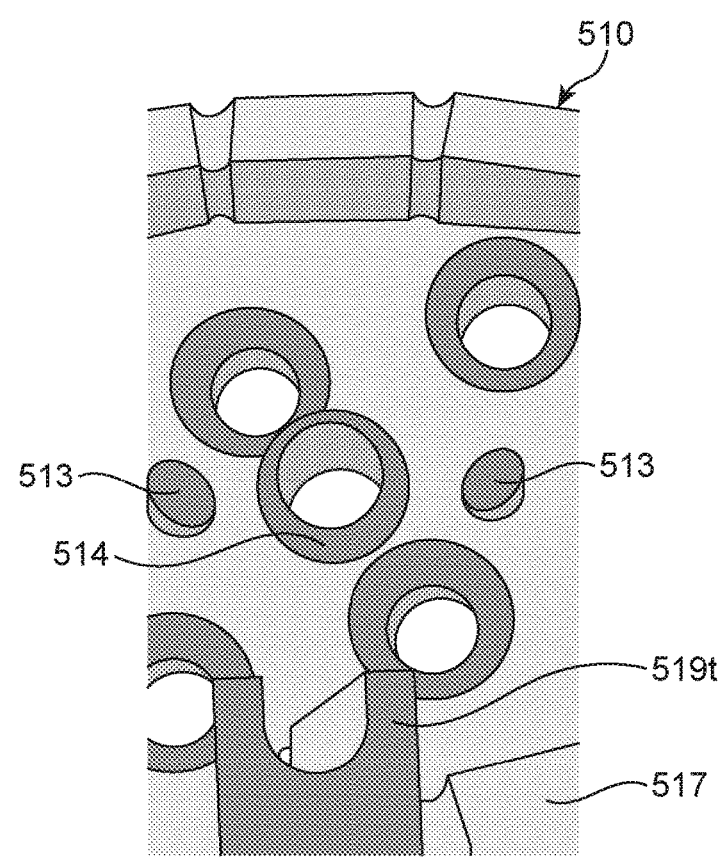
FIG. 5 shows a partial cut away top view of a portion of a propeller adapter in accordance some embodiments.

FIG. 5 shows a partial cut away top view of a portion of a propeller adapter 510 in accordance some embodiments. This embodiment has additional bosses 513 space apart laterally from the central alignment boss 514. The optional additional laterally offset bosses 513 are pins that extend upward from the base of the propeller adapter 510 and mount within corresponding holes, for example lateral hole 625*h* in FIG. 6, in the propeller 625 shown in FIG. 6. The optional offset bosses 513 provide additional alignment posts when seating the propeller and provide some additional rotational stabilization. As with the central boss 514, the optional offset bosses 153 may have a cylindrical with or without a radiused top portion, a truncated cylindrical, a partial cylindrical, or their combinations, or other configurations such as a conical or partial conical to facilitate propeller placement, and mounting of the bosses within corresponding holes in the propeller. It should be noted that in some embodiments, it is possible to omit the central alignment boss 514. In such embodiments, the offset bosses 513 can provide proper alignment of the propeller within the propeller adapter 510.

It is possible in some embodiments to further include an optional locking tab 519*t* integrally formed and extending beyond the lip 517 of the sidewall of the adapter 510. The locking tab 519*t* may snap down into place over a propeller after the propeller is seated within the adapter. In some embodiments, the locking tab 519*t* may lock with a corresponding optional integrally formed extended locking tab (not shown), which extends from the opposing sidewall of the adapter 510 to interlock with the locking tab 519*t* over the propeller.

Figure 6:
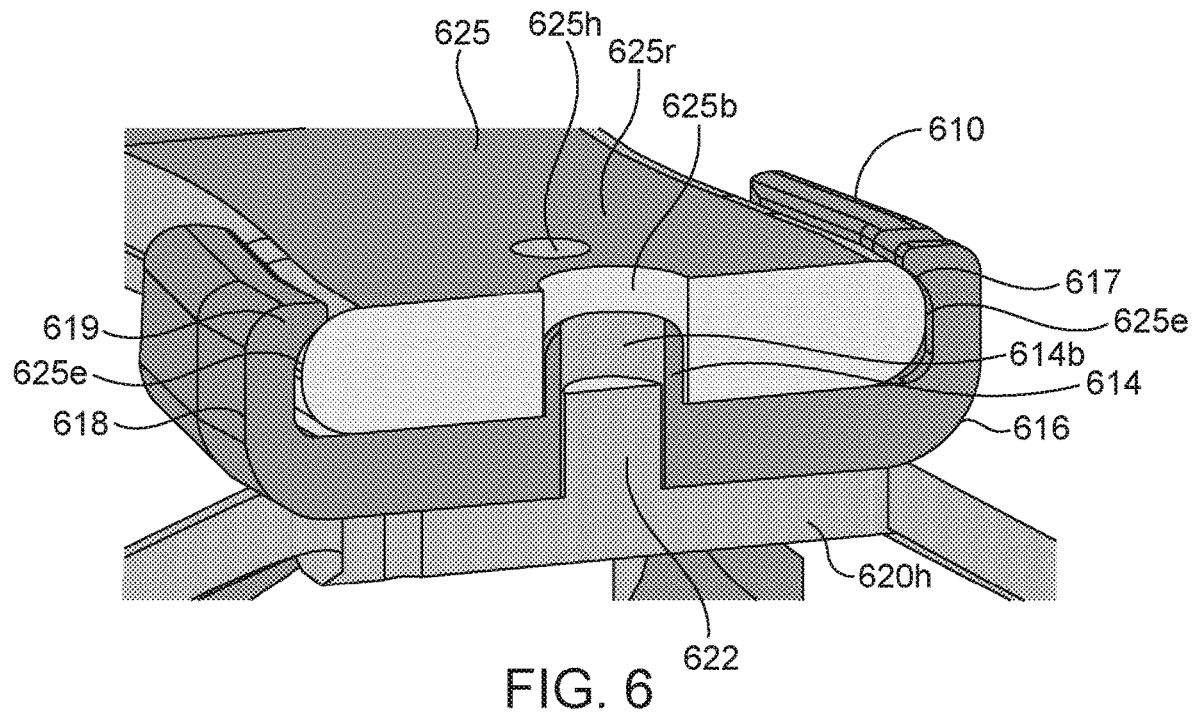
FIG. 6 is a cut way side perspective view of a portion of propeller mounted within a propeller adapter.

FIG. 6 is a cut way side perspective view of a portion of propeller 625 mounted within a propeller adapter 610. The propeller adapter 610 is mounted on the motor hub 620*h*. The hub boss pin 622 seats within the bore hole 614*b* of the adaptor alignment boss 614. The adapter alignment boss 614 seats within the propeller central alignment hole 625*b*, either part way as shown, or all the way, in some embodiments. The alignment boss 614 is sized to mount within an alignment hole 625*b* located in the root portion 652*r* of a propeller 625 aligned along the central axis of rotation of the propeller.

The propeller 625 is mounted into the adapter by snap fitting so that the inward facing rims or lips 617 and 619 contact and hold the corresponding edges 625*e* seated thereinunder. The rims 617 and 619 extend so as to allow the propeller to be seated thereunder during installation and far enough to create an interference fit over the upward facing portion of the radiused edges of the propeller root portion with sufficient force to keep the propeller from dislodging when the propeller is spinning and the aerial vehicle is maneuvering in a typical flight profile.

Figure 7:
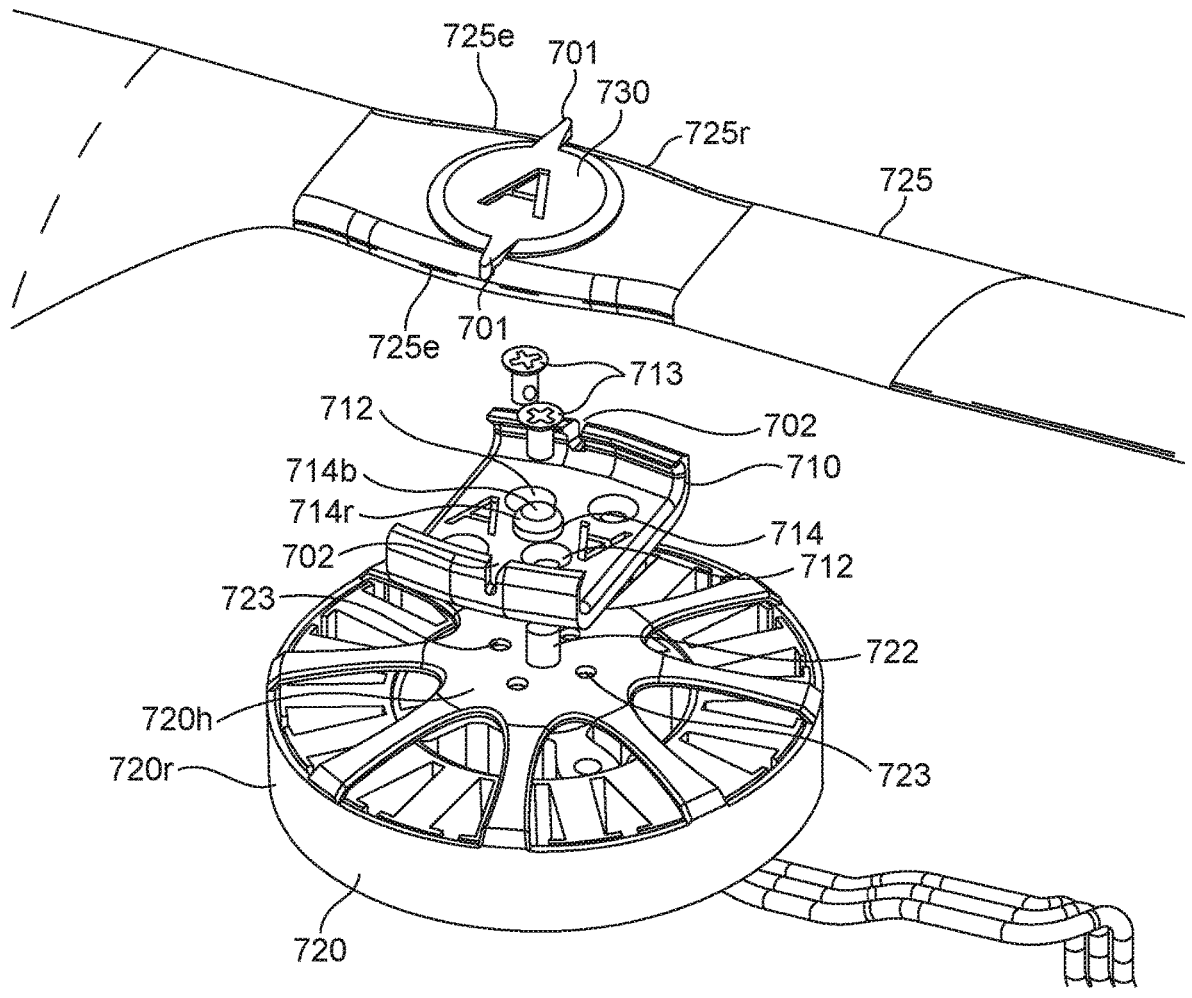
FIG. 7 shows a possible embodiment in exploded partial perspective view illustrating the motor, the propeller adapter, the propeller and the propeller differentiator overlay arrangement.

FIG. 7 shows a possible embodiment in exploded partial perspective view illustrating how the motor 720, the propeller adapter 710, the propeller 725 and the propeller differentiator overlay 730 are arranged. In the embodiment shown, the propeller adapter 710 is mounted to a hub portion 720*h* of the rotor 720*r* of the outrunner motor 720. In some embodiments, a hub boss pin 722 is centrally located in the hub portion 720*h* of the rotor 720*r*. In this embodiment, the adapter alignment boss 714 has a hole or bore 714*b* extending part way or all the way through the adapter alignment boss 714 which is sized to receive the hub boss pin 722. The hub boss pin 722 within the alignment boss hole 714*b* serves to align the propeller adapter 710 on the central rotational axis of motor 720. Preferably, the hub boss pin 722 fits securely within the alignment boss hole 714*b* so as to inhibit translational movement of the adapter 710 mounted thereon, but which allows removal of the adapter 710 from the hub boss pin 722 during maintenance procedures.

One or more of the screws 713 are screwed into screw holes 723 in the rotor hub 720*h* to secure the adapter 710 with the rotor 720*r* and hold the adapter 710 in alignment with central axis of rotation of the motor 720. Typically, the screw holes are countersunk to allow the screw heads to be flush with the top surface of the base of the adapter. In some embodiments without the hub boss pin 722, multiple screws 713 serve to align the adapter 710 with the central rotational axis of the rotor 720*r* as the screws 713 are seated within the screw holes 723.

After the propeller adapter 710 is mounted to the motor 720, the propeller 725 is snap fit into the propeller adapter 710 at a root portion 725*r* of the propeller 725, with the outside edges 725*e* of the root portion 725*r* being firmly cradled and held firmly in place by the propeller adapter 710 when mounted therein. The outside edges 725*e* of the propeller root or hub portion are radiused. The radial cross section of the edges of the propeller hub portion allow the propeller to more easily be snap fit into the adapter 710.

The adapter 710 is constructed to allow and facilitate snap fit installation and removal of the propeller 725 into and out of the adapter 710 by a person, by hand, without requiring any tools. In some embodiments, the adapter is formed of a polyaryletherketone or PAEK such as polyether ether keytone or PEEK. Other organic thermoplastic polymers are possible. In other embodiments, other materials such as Delrin (homopolymer acetal or POM-H), ABS (Acrylonitrile butadiene styrene), POLYCARB (Polycarbonate), or ULTEM (polyetherimide or PEI) could be used, depending on the application. Natural color PEEK has the advantage of being sufficiently stiff to hold the propeller in place while in operation in a UAV, while being flexible enough to allow the propeller to be repeatedly installed into and removed from the adapter by hand. It is anticipated that additional material with similar mechanical characteristics to PEEK could be utilized. In some embodiments, the adapter is fabricated of unreinforced PEEK using a thermoplastic mold technique. In some embodiments, it may be desirable to use 3D printing, or use machining techniques, or to utilize reinforced PEEK, depending on the application. PEEK is commercially available, for example from Curbell Plastics, Inc., of Orchard Park, NY, www.curbellplastics.com.

The alignment tabs 701 of the differentiator overlay 730 will seat within corresponding alignment slots 702 of the propeller adapter 710. In this embodiment, the alignment slots 702 have a radiused bottom wall. The general tapered profile of alignment tabs 701, which mount within the alignment slots 702, allows bottom wall of the slots 702 to be radiused rather than flat. Further, the radiused bottom wall provides improved structural strength and inhibits cracking of the side wall of the propeller adapter 710 as compared to the more squared bottom illustrated in FIG. 2. This provides added robustness to the side walls which experience significant force.

As shown in FIG. 7, the matching recessed, letter "A", which may be color coded, provide visual indications that the handedness of the motor and the propeller correspond. Furthermore, as shown in FIG. 7, the location of the alignment tabs 701 and the placement of the alignment slots 702 correspond and allow mounting of the propeller 725 within the adapter 710 when the handedness of the motor and the propeller 725 correspond, such that the wrong propeller cannot be installed on the wrong motor. The alignment tabs 701 in cooperation with the alignment slots 702 prevent the incorrect propeller from being mounted therewith. As such, in the circumstances where there is low lighting, or if the installer of the propeller is unable to distinguish colors, for example colorblind, the propeller adapter 710 in combination with the propeller differentiator overlay ensure that the proper propeller is installed with the proper motor. This is especially important when there are multiple motors which include motors with opposite rotational orientations on same aerial vehicle.

In some embodiments, a top portion of the adapter alignment boss 714r may be radiused, or rounded, to facilitate mounting of the propeller alignment hole 625b (shown in FIG. 6) onto the adapter alignment boss 714 while the propeller 725 is being snap fit into the adapter 710. Thus, the cylindrical alignment boss 714 may have a topmost peripheral portion 714r that is rounded or radiused around the circumference of the cylindrical alignment boss 714, instead of a right-angled profile or cross-section. Although the propeller root portion 725 can be pressed flatly into the adapter 710, in another implementation, the propeller root portion 725 is installed in the adapter 710 by seating one of the outside edges 725e of the propeller root portion 725 into the adapter 710 and then rotating the propeller root portion 725 until the other of the outside edges 725e snaps down into place within the adapter 710. The root portion 725r of the propeller 725 is thus seated and held within the adapter 710 in rotational alignment with the central rotational axis of the motor.

The spin loads are on outside edges 725e of propeller 725, so the walls 216 and 218 (FIG. 2) need sufficient rigidity to withstand these loads. As illustrated in FIG. 2, in some embodiments, the wall 216 may have a radiused "corner" seam 216c where the inward facing side of the wall 216 attaches to the base 210. In some embodiments, a relief fillet is added in the seam 216c between the wall 215 and the base 210 to increase the radius of material along the corner seam 216c between the wall and the base 210. As such, there is additional material for stress relief to reinforce the corner seam 216c, forming a gusset to inhibit cracking or splitting between the wall 215 and the base 210. A similar radiused corner seam is located between the side wall 216 and the lip 217, which also may have similar additional material along the seam to provide reinforcement. In the embodiment of FIG. 2, the walls 216 and 219 are shown each with four portions, a lower radiused portion between a generally straight mid-portion and an upper radiused portion, with the upper radiused portion being located between the generally straight or mid-portion and the lips 217 and 219. Thus, in various embodiments, the side walls 216 and 219 are permitted to repeatedly flex outward as a propeller is being installed by snap fit into the adapter, and then to spring back inward as the propeller seats against the base within the adapter, thereby holding the propeller in place against the base during operation, but allowing removal of the propeller by hand before or after operation.

Although in the embodiment shown in FIG. 6, the lips 617 and 619 are shown extending and engaging the rounded or radiused edges 625e of root 625r of the propeller 625, it is possible that one or more of the lips 617 and 619 may extend further beyond the radiused edge(s) onto the top flat surface of the root 625r in other embodiments.

An advantage of limiting the length of the extension of the lip as shown is that it is more robust and also facilitates quick, easy insertion and removal of the propeller by hand without requiring any tools, or excess force. Thus, the propeller may be snap fit by hand into the adapter by inserting one if its hub edges under one lip of the adapter and then rotating the propeller along the longitudinal axis so that the other edge of the root portion rotates down to contact the opposing lip, causing the lip (and wall) to flex outward until the furthest portion of the edge of the hub slides past the lip, the lip flexes back inward, allowing the propeller hub to seat in the adapter under the lip. For removal, the rotation of the propeller along its longitudinal axis causes the edge of the hub to urge upward against the lip so as to urge the lip (and wall) outward responsive to the curvature of the edge of the hub until the furthest portion of the edge of the hub slides upwardly past the lip, releasing the propeller hub from the adapter.

In various embodiments, the inward facing peripheral edge of the lip may be partially or completely radiused or rounded to facilitate the radiused or rounded edge of the hub to slide past it during the snap fit installation and removal processes.

In various embodiments, the adapter material is flexible and resilient enough to allow propeller installation and removal multiple times, for example about 25, 50, 100, 200, or more, while being strong and rigid enough to retain the propeller under normal dynamic aircraft maneuvering within the flight envelope of the aircraft.

An advantage of some embodiments is that it provides the propeller with a rigid connection to the motor with minimal backlash throughout the useable temperature range. Another advantage of various embodiments, is that it provide a robust can low cost rigid connection between propeller and motor.

An advantage of various embodiments is that the differentiator overlay disks or alignment disks prohibit the user from installing the wrong propeller onto the wrong motor. This is particularly critical in VTOL quad motor UAVs with two CW and two CCW motors and propellers. In some embodiments, the differentiator overlay discs or alignment disks may be color paired with the corresponding adapters. In some embodiments, the interference features prevent improper installation.

An advantage of various embodiments is that it can reduce the time it takes to install the propellers onto the corresponding matched rotationally motors. Such embodiment can not only speed-up installation, but also reduce propeller removal time. An advantage of the snap fit feature of various embodiments is that it allows a rigid, carbon fiber-to plastic-to aluminum contact between the propeller blade, adapter, and motor, respectively.

Although shown in FIG. 1 with a forward-facing propeller and four upward facing propellers, other embodiments are not limited to this configuration. For example, in some embodiments the forward-facing motor and propeller are may be omitted. In yet other embodiments, there may be more or fewer vertical facing motors and propellers. In some embodiments, the propellers 125, 135, 145, and 155, may have fixed pitch, while in other embodiments the propellers have an adjustable rotational pitch. Additionally, although illustrated with a unitary propeller, it is envisioned that the hub portion and the propeller blade be separate pieces, i.e. the blade pieces may fold with respect to the hub portion of the propeller, typically folding along the horizontal plane of the hub.

Although show in the context of UAV, embodiments of the invention are not limited to UAVs. Further not all parts are required in all embodiments. The above described apparatuses, methods, and systems are not limited to UAVs, or aircraft. Various implementations and/or embodiments may include other motor uses, i.e. auto, industrial, etc., to replace traditional mounting of motor attachments.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A propeller adapter comprising: a) a base comprising: 1) at least one fastener hole through the base; and 2) a propeller alignment boss extending upward from the base; b) opposing blade capture walls extending upward from the base, each of the opposing blade capture walls comprise a lip extending inward to capture and retain corresponding opposing outside edges of a root portion of a propeller in the base upon seating of the propeller root portion between the opposing blade capture walls; and c) a propeller differentiator overlay for affixing to the propeller, wherein the base and the propeller differentiator overlay are color coded to correspond to a rotational orientation of a motor and the propeller.

2. The propeller adapter of claim 1, wherein the propeller adapter further comprises:
    a) a differentiator slot in at least one of the opposing blade capture walls; and
    b) the propeller differentiator overlay comprising a differentiator tab extending laterally from the differentiator overlay so as to align with and fit within the slot in the at least one of the opposing blade capture walls.

3. The propeller adapter of claim 2, wherein the alignment boss further comprises an axially aligned central hole through the alignment boss, and wherein the alignment boss is centrally disposed in the propeller adapter so as to center the propeller above a central axis of the motor when mounted with the motor and the propeller.

4. The propeller adapter of claim 1, wherein the base of the propeller adapter and the propeller differentiator overlay comprise characters corresponding to a rotational orientation of the motor.

5. The propeller adapter of claim 1, wherein the blade capture walls extend upward from opposing peripheral edges of the base.

6. The propeller adapter of claim 1, wherein the alignment boss further comprises an axially aligned central bore through the alignment boss, wherein the alignment boss is centrally disposed in the propeller adapter so as to align the propeller adapter with a central axis of the motor when mounted with the motor.

7. A VTOL capable UAV comprising:
    a) a motor;
    b) a propeller comprising an alignment hole through a root portion of the propeller;
    c) a propeller adapter mounted to the motor, the adapter comprising:
        (1) a base comprising:
            (i) at least one fastener hole through the base to allow fastening of the adapter to the motor; and
            (ii) an alignment boss extending upward from the base;
        (2) opposing blade capture walls extending upward from the base, each of the opposing blade capture walls comprising a lip to capture and retain corresponding outside edges of the propeller root portion upon seating of the propeller root portion between the opposing blade capture walls; and
        (3) an alignment slot in at least one of the opposing blade capture walls;
    d) an alignment overlay secured to the propeller, the alignment overlay comprising a tab extending laterally from the overlay so as to fit within the slot in the at least one of the opposing blade capture walls; and
    e) wherein the base and the alignment overlay are color coded to correspond to a rotational orientation of the motor and the propeller.

8. The VTOL capable UAV claim 7, wherein the alignment hole in the propeller is centrally located in the root portion of the propeller, and wherein the alignment boss is centrally disposed in the adapter so as to center the propeller above a central axis of the motor.

9. The VTOL capable UAV of claim 8, wherein the propeller comprises a plurality of the alignment hole in the root portion of the propeller, and wherein the propeller adapter comprises a plurality of the alignment boss disposed in the adapter corresponding to the plurality of alignment holes so as to center the propeller above a central axis of the motor.

10. The VTOL capable UAV of claim 7, wherein the alignment hole comprises a plurality of alignment holes space apart in a root portion of the propeller, and wherein the alignment boss comprises a plurality of alignment bosses corresponding to the plurality of alignment holes in the propeller so as to center the propeller above a central axis of the motor.

11. The VTOL capable UAV of claim 7, wherein the propeller comprises a plurality of the alignment hole in the root portion of the propeller, and wherein the propeller adapter comprises a plurality of the alignment boss disposed in the adapter corresponding to the plurality of alignment holes so as to center the propeller above a central axis of the motor.

12. The VTOL capable UAV of claim 7, wherein the propeller adapter comprises an alignment slot in each of the opposing blade capture walls, and wherein the alignment overlay comprises a plurality of tabs extending from the overlay so as to fit within a corresponding one of the alignment slot in each of the opposing blade capture walls.

13. The VTOL capable UAV of claim 7, wherein the motor is an outrunner motor comprising an outrunner rotor surrounding an inner stator, and wherein the propeller adapter is mounted to the outrunner rotor.

14. The VTOL capable UAV of claim 7, wherein the motor is an inrunner motor comprising an inrunner rotor surrounded by an outer stator, and wherein the propeller adapter is coupled with the inrunner rotor.

15. The VTOL capable UAV of claim 7, wherein the alignment boss further comprises an axially aligned central hole through the alignment boss, and wherein the alignment boss is centrally disposed in the propeller adapter so as to center the propeller above a central axis of the motor when mounted with the motor and the propeller.

\* \* \* \* \*